US012730203B2

(12) United States Patent
Ekchian

(10) Patent No.: US 12,730,203 B2
(45) Date of Patent: Sep. 8, 2026

(54) USING REFERENCE ROAD SEGMENTS TO CALIBRATE THE RESPONSE OF VEHICLE SENSOR SYSTEMS

(71) Applicant: ClearMotion, Inc., Billerica, MA (US)

(72) Inventor: Jack A. Ekchian, Belmont, MA (US)

(73) Assignee: ClearMotion, Inc., Billerica, MA (US)

( * ) Notice: Subject to any disclaimer, the term of this patent is extended or adjusted under 35 U.S.C. 154(b) by 23 days.

(21) Appl. No.: 18/703,529

(22) PCT Filed: Oct. 24, 2022

(86) PCT No.: PCT/US2022/047561
§ 371 (c)(1),
(2) Date: Apr. 22, 2024

(87) PCT Pub. No.: WO2023/076155
PCT Pub. Date: May 4, 2023

(65) Prior Publication Data
US 2024/0418842 A1 Dec. 19, 2024

Related U.S. Application Data

(60) Provisional application No. 63/271,472, filed on Oct. 25, 2021.

(51) Int. Cl.
*G01S 7/497* (2006.01)
*B60W 40/06* (2012.01)
*G01S 17/89* (2020.01)

(52) U.S. Cl.
CPC .......... *G01S 7/4972* (2013.01); *B60W 40/06* (2013.01); *G01S 17/89* (2013.01)

(58) Field of Classification Search
CPC ..................................................... G01S 7/4972
See application file for complete search history.

(56) References Cited

U.S. PATENT DOCUMENTS 7,089,099 B2 * 8/2006 Shostak ................ B60C 23/005 701/34.3
7,421,334 B2 * 9/2008 Dahlgren ........... G01C 21/3691 701/408
7,562,563 B2 * 7/2009 Wee ..................... G01B 11/306 73/104
9,187,099 B2 * 11/2015 Powers .................. G08G 1/015
10,378,159 B2 * 8/2019 Svantesson .............. G01C 7/04
11,801,726 B2 * 10/2023 Sridhar .................. B60G 21/08
(Continued)

OTHER PUBLICATIONS

International Search Report and Written Opinion for International Application No. PCT/US2022/047561 mailed Feb. 3, 2023.
(Continued)

*Primary Examiner* — Michael A Berns
(74) *Attorney, Agent, or Firm* — Wolf, Greenfield & Sacks, P.C.

(57) ABSTRACT

Systems and methods described herein include implementations where performance of systems for measuring aspects of a road surface, such as sensor systems, on board a production vehicle may be improved by using data collected by the production vehicle while traveling on primary and/or secondary reference road segments. Primary reference road segments in a road network may be characterized by specially equipped vehicles.

25 Claims, 5 Drawing Sheets

(56) References Cited

U.S. PATENT DOCUMENTS

| | | | | |
|---|---|---|---|---|
| 12,146,806 | B2 * | 11/2024 | Kim | G01B 11/24 |
| 2005/0065711 | A1 | 3/2005 | Dahlgren et al. | |
| 2006/0025897 | A1 | 2/2006 | Shostak et al. | |
| 2008/0184785 | A1 | 8/2008 | Wee | |
| 2015/0166072 | A1 | 6/2015 | Powers et al. | |
| 2016/0201277 | A1 | 7/2016 | Svantesson et al. | |
| 2020/0139784 | A1 | 5/2020 | Sridhar et al. | |
| 2024/0418842 | A1 * | 12/2024 | Ekchian | G01S 7/4972 |

OTHER PUBLICATIONS

International Preliminary Report on Patentability for International Application No. PCT/US2022/047561 mailed May 10, 2024.

* cited by examiner

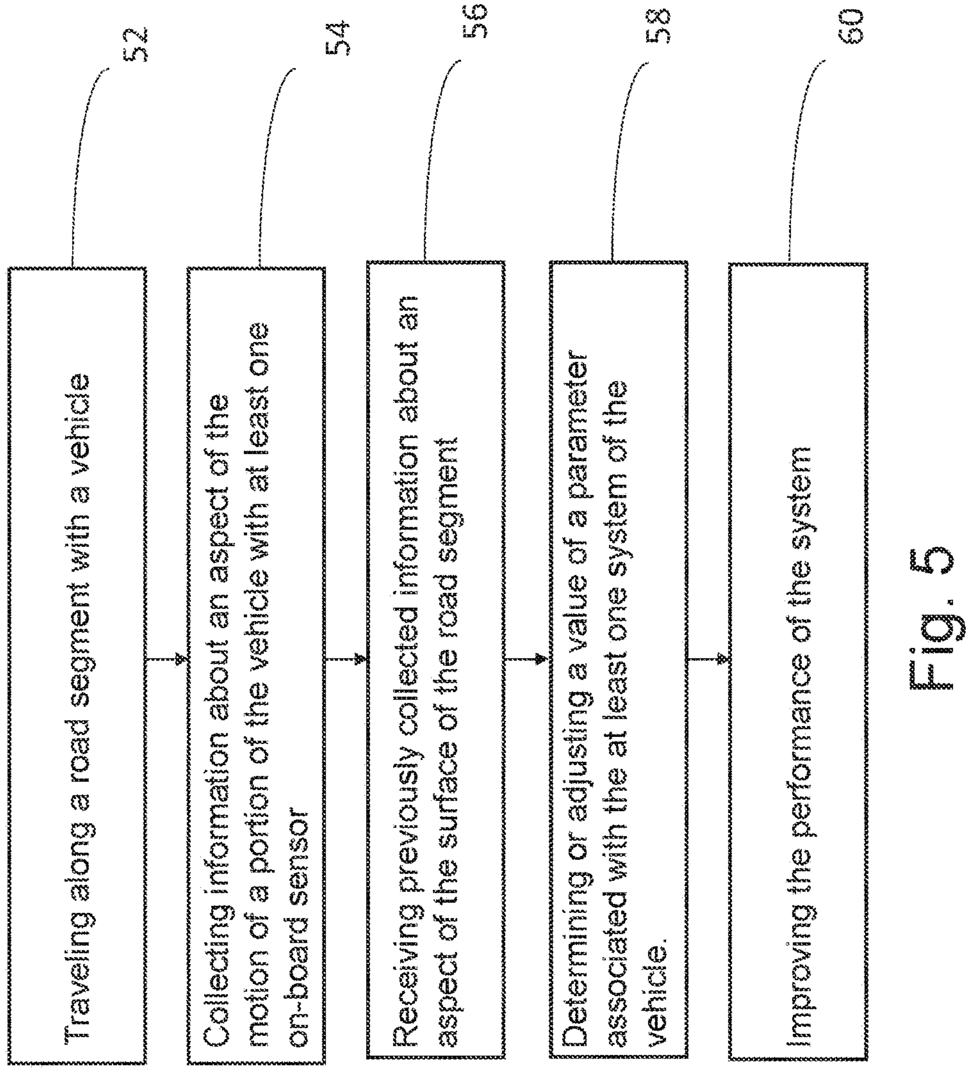
Fig. 5
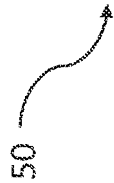

USING REFERENCE ROAD SEGMENTS TO CALIBRATE THE RESPONSE OF VEHICLE SENSOR SYSTEMS

RELATED APPLICATIONS

This application is a national stage filing under 35 U.S.C. § 371 of International Patent Application Serial No. PCT/US2022/047561, filed Oct. 24, 2022, which claims the benefit of priority under 35 U.S.C. § 119 (e) of U.S. Provisional Application No. 63/271,472, filed Oct. 25, 2021, the contents of each of which are incorporated herein by reference in their entirety.

SUMMARY

According to one aspect, this disclosure discusses a method for operating a vehicle, e.g., a production vehicle. The method may include travelling, with the vehicle, on a road segment, e.g., a primary reference road segment, where the road segment is a part of a road network. The method may also include receiving data from a sensor, e.g., a production sensor, on-board the vehicle while traveling along the road segment; receiving data from a data storage, where the data is related to road surface characteristics of the road segment, and the data was previously collected using at least one other vehicle that was equipped with one or more accurate sensors, e.g., specialized road surface sensor systems configured to accurately measure road surface characteristics, such the road surface profile (e.g. vertical deviations from an average or nominal surface of the road segment). The method may also include using the data received from the sensor on-board the vehicle and the data from the data storage to calibrate the on-board sensor, e.g., the production sensor. In some implementations, the calibration may include modifying at least one parameter of a transfer function associated with the on-board sensor that relates an output of the on-board sensor to road surface characteristics of roads or road segments that the vehicle is traveling over. In some implementations, the road surface characteristics may be a road surface profile of a road or a road segment. In some implementations the data received from sensors on-board the vehicle and/or the data base may be processed by one or more microprocessors on-board the vehicle. Alternatively or additionally, data received from one or more sensors on-board the vehicle, while traveling along the road segment, and/or the data base may be processed by one or more remotely located microprocessors, e.g. cloud based microprocessors. In some implementations, the method may also include determining that one or more production sensors in a given production vehicle, and the associated transfer functions determined when traveling on a primary reference road segment, are sufficiently accurate to determine road surface characteristics of another road segment. This may be achieved by applying the inverse transfer functions to sensor measurements to accurately determine road surface characteristics of a secondary reference road segment that cause a particular sensor response when the vehicle is traveling along the road segment. In some implementations, the method may include using the response of or signal from one or more sensors on-board a vehicle, while traversing a road segment, e.g., a secondary reference road segment, and previously determined information about the surface of the road segment to calibrate the one or more of the on-board sensors of the vehicle and/or to determine or to adjust the value of at least one parameter associated with the on-board sensor or the transfer function of the on-board sensor(s).

According to one aspect, this disclosure discusses a method for operating a vehicle, e.g., a production vehicle that may include travelling on a road segment with the vehicle, where the road segment is a part of a road network. The method may also include collecting information about a road surface characteristic of the road segment with a sensor, e.g., a production sensor on-board the vehicle, and also receiving information about the road surface characteristic that is at least partially based on data previously collected by another vehicle that, e.g., includes at least one specialized road surface sensor system. The method may also include calibrating the production sensor by adjusting the value of at least one parameter associated with the on-board sensor, based on the information from the sensor and the data base. In some implementations, the calibration includes modifying at least one parameter of a transfer function that relates an output of the sensor on board the vehicle to the road surface characteristic. In some implementations the road surface characteristic is the road surface profile of the road segment.

According to one aspect, this disclosure discusses a method for operating a vehicle, e.g. a production vehicle, that includes traveling along a road segment with the vehicle, where the road segment is e.g., either a primary or secondary road reference segment, and where the road segment has a road surface profile; receiving a signal representative of the response of an on-board sensor while traveling along the road segment; receiving prerecorded information about the road surface profile of the of the road segment; and based on information received from both sources, determining a degree of accuracy of the sensor. In some implementations, some information collected while traveling along the road segment may be uploaded to the cloud, the degree of accuracy of the data may be determined to be above a threshold value. Such data may be retained or used to characterize one or more parameters associated with the road segment or an aspect of the vehicle. Alternatively, the information may be discounted or discarded if the degree of accuracy is determined to be below a threshold value.

According to one aspect, this disclosure discusses a method for improving the performance of a system, e.g. a sensor system, on board a vehicle while traveling on a road segment, where the method includes: receiving information related to a road surface profile of the road segment from at least one sensor system on-board the vehicle, while traveling along the road segment; adjusting a value of a parameter associated with the sensor system on-board the vehicle, based on the information; and as a result, improving a performance of the sensor system.

As used herein, the term "sensor system" refers to a sensor and associated electronics for processing the sensor signal. In some implementations, the at least one sensor system may be an accelerometer system, an IMU system, a displacement sensor system, an optical sensor system, a LIDAR system. In some implementations the road segment may be a primary reference road segment or a secondary reference road segment. In some implementations the method may further include adjusting the value of the parameter based on the information related to the road surface profile of the road segment received from the sensor system on-board the vehicle and previously stored information related to the road surface profile of the primary reference road segment or the secondary reference road segment.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in the various figures may be represented by a like numeral. For purposes of clarity, not every component may be labeled in every drawing. In the drawings:

FIG. 5 is a flow chart depicting a method of improving the performance of a system of a vehicle.

DETAILED DESCRIPTION

Figure 1:
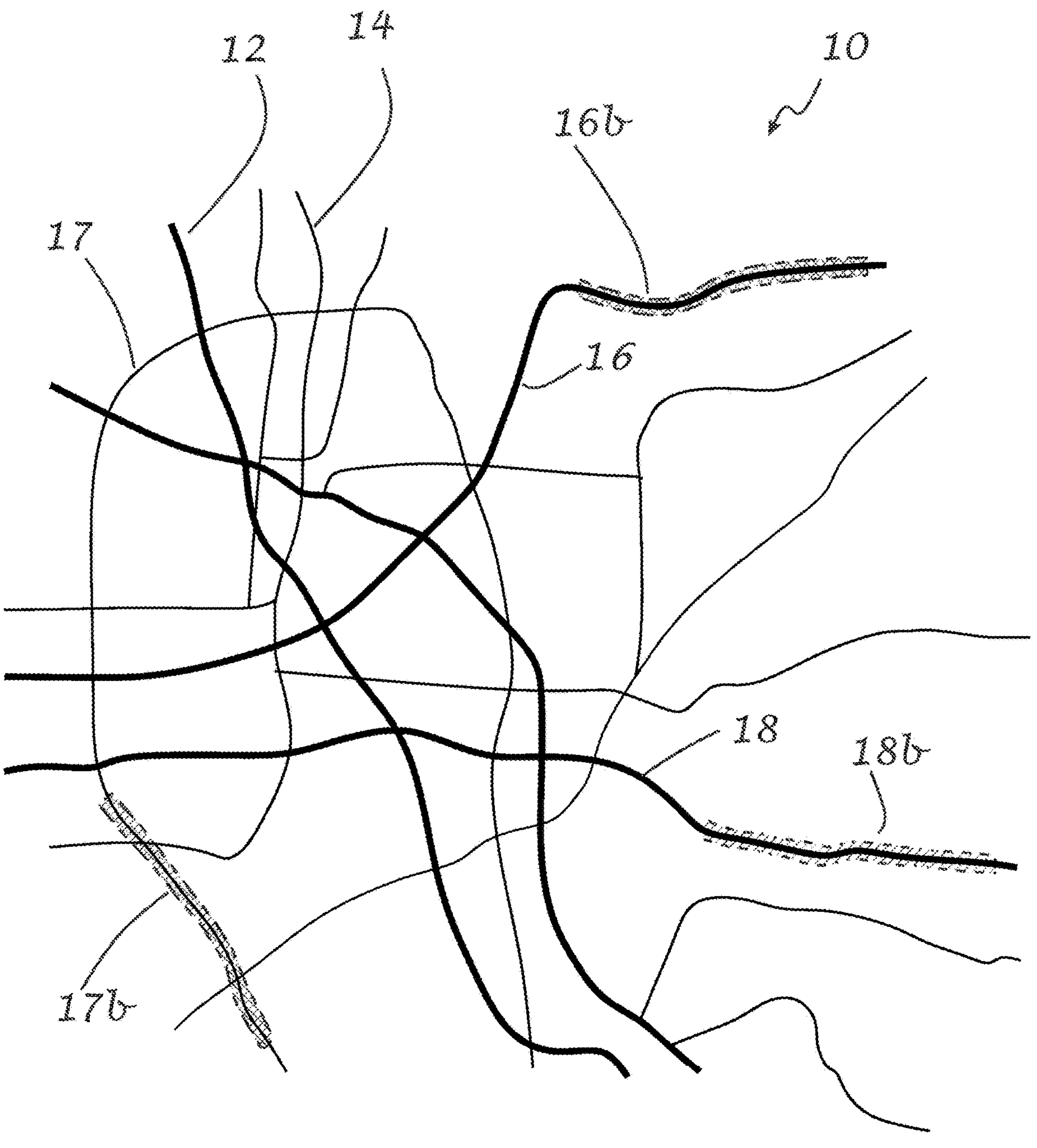
FIG. 1: Illustrates a road network with both highways and secondary roads.

Today's production vehicles may be equipped with inertially based production vehicle sensors or sensor systems, such as, for example, accelerometers, IMUs, displacement sensors, etc. Some of these sensors, which may be responsive to disturbances, e.g. motion, acceleration, or displacement, induced in at least a portion of the vehicle as a result of the interaction with aspects of the road surface, e.g. road surface anomalies or features (e.g. bumps, pot holes, surface cracks and other discontinuities, manhole covers, etc.) may be used to characterize and map the road surface. Alternatively or additionally, production vehicles may be equipped with remote sensing systems, e.g. optical sensors such as cameras and LIDAR, which may be used to remotely map the road surface.

Inertial and/or remote sensors may be used to collect data about the road surface which may be used to characterize aspects or features of that surface. For example, data from certain sensors, e.g., optical sensors, accelerometers and/or displacement sensors, attached to an unsprung mass or sprung mass of a vehicle (e.g. the wheel assembly or vehicle body) may be used to determine the profile of the road surface (i.e. "road surface profile") through direct measurement (e.g. optically) and/or computationally from inertial measurements. Such data from multiple vehicles may be aggregated, e.g., by averaging crowd sourced data, to improve the accuracy of the resulting road surface profile.

A road surface profile for a particular road segment may be supplied to one or more vehicles and used on-board those vehicles, e.g., for terrain-based localization, independently or in conjunction with other localization systems, such as Global Navigation Satellite Systems (GNSS), and/or to control various systems on-board those vehicles, e.g., active suspension systems, semi-active suspension systems, steering systems, or braking systems.

As used herein, the term "production vehicle" refers to a vehicle sold, in the ordinary course of business, to the general public by vehicle manufacturers such as, for example, Stellantis, Volvo, Ford, General Motors, Tesla, Nio, etc. As used herein, the term "production vehicle sensors" refers to standard or optional sensors incorporated in production vehicles when the vehicles are being manufactured.

However, terrain-based data collected by production sensors on board production vehicles may be inaccurate or otherwise of poor quality due to shortcomings or limitations of production sensor systems. For example, sensors in production vehicles may be: positioned non-optimally, out of calibration, misaligned and/or otherwise defective.

Also, sensors such as accelerometers or IMUs may be located in or otherwise attached to a vehicle's sprung mass, e.g., the vehicle body, and may be used to collect data related to a road surface, e.g. the road surface profile. However, the sensor signals attached to the sprung mass may be more difficult to interpret because they may be affected by the dynamics of the vehicle body, e.g., suspension system performance and the inertia of the sprung mass.

Optical sensors, e.g., cameras or LIDAR systems, incorporated in production vehicles during the manufacture may also be hampered by, for example, degraded visibility, resolution limits, misalignment and poor calibration.

Therefore, in some embodiments, the road surface characteristics, such as road surface profile, based on data from one or more production vehicles may include inaccuracies. Inventors have recognized that the adverse effect of production vehicle limitations or inadequacies, for example, of road surface profile measurements, may be mitigated or effectively eliminated by using one or more primary and/or secondary reference road segments in a road network. As used herein, the term "primary reference road segment" refers to a road segment, in a road network, where road surface characteristics, e.g., the road surface profile, may be determined to a higher level of accuracy by using one or more vehicles (e.g., ground or airborne vehicles, or satellites) that are equipped with at least one specialized road surface sensor system configured to accurately measure road surface characteristics, such as the surface profile of a road. As used herein, the term "specialized road surface sensor system" refers to systems that may be used to determine road surface characteristics, e.g., road surface profiles, more accurately than production vehicle sensors. Specialized road surface sensor systems may include, for example, equipment manufactured by Topcon Positioning Systems, Inc. or their equivalents. For example, the Topcon RD-M1 Scanner or equivalents may be used to accurately and directly measure road surface data, e.g., road surface profile. In some embodiments using surface vehicles (e.g., cars, vans or trucks) equipped with this sensor system, high-accuracy road profile data may be collected while traveling at, for example, highway speeds. In some embodiments, such vehicles equipped with one or more specialized road surface sensor systems, may also include high-accuracy vehicle-localization systems, that may be used to determine where the road surface measurements are being made, much more precisely than GNSS systems incorporated in production vehicles during manufacture. In some embodiments specialized road surface sensor systems may include hardware and/or software, to operate and collect data from the sensors, that may be used to determine a road profile of a road segment with an accuracy that is in the range of two times to 20 times greater than that which may be determined using production vehicle sensor systems. As used herein, the term "high-accuracy vehicle-localization system" refers to a localization system that may be used to determine the location of a vehicle with an accuracy in the range of two to 20 times more accurately than GNSS systems typically incorporated in production vehicles, during the manufacture of such vehicles. Ranges of accuracy of specialized sensor systems and high-accuracy vehicle-localization systems both greater and less than the ranges indicated above are also contemplated, as the disclosure is not so limited.

FIG. 1 illustrates a road network 10. In FIG. 1, road 12, represented by a thicker, darker line is a highway while road 14, represented by a thinner, lighter line is a secondary road. Road 16 may include a primary reference road segment **16*b* that may be characterized by using vehicles, e.g., road or airborne vehicles, that include one or more high-accuracy specialized sensor systems. Once road segment 16*b* is characterized, as illustrated in FIG. 2, with sensors not typically incorporated in production vehicles during manufacture, the data may be used to evaluate, calibrate or tune vehicle sensor systems of production vehicles that also travel along the same road segment 16*b***.

Figure 2:
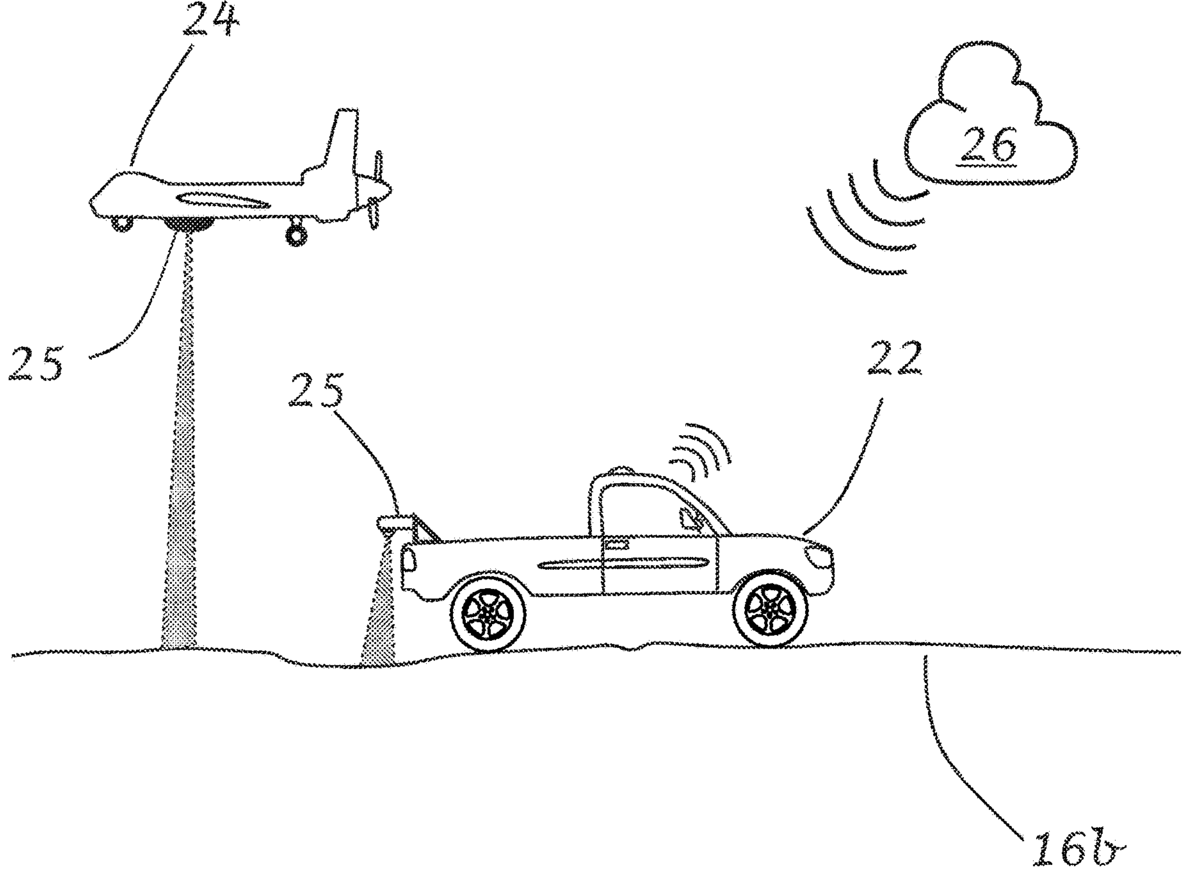
FIG. 2: Illustrates a primary reference road segment, in the network shown in FIG. 1, being characterized by vehicles equipped with a specialized high accuracy sensor for determining road surface characteristics.

FIG. 2 illustrates exemplary vehicles such as pickup truck 22, and manned or unmanned aircraft 24 that may include at least one specialized road surface sensor system 25 attached to the pickup 22 and configured to collect high accuracy data about roads such as road segment **16*b*. In some embodiments, system 25 may include, for example, a Topcon model RD-M1 Scanner. The RD-M1 includes a 3D laser scanner that can be used to scan the road surface. The data collected by vehicles 22 and/or 24 may be processed on board the vehicles, uploaded to the cloud 26**, or any other convenient location for processing and/or storage.

Figure 3:
FIG. 3: Illustrates a production vehicle equipped with production vehicle sensors, that are being calibrated while the vehicle is traveling over the primary reference road segment shown in FIG. 2.
Figure 3:
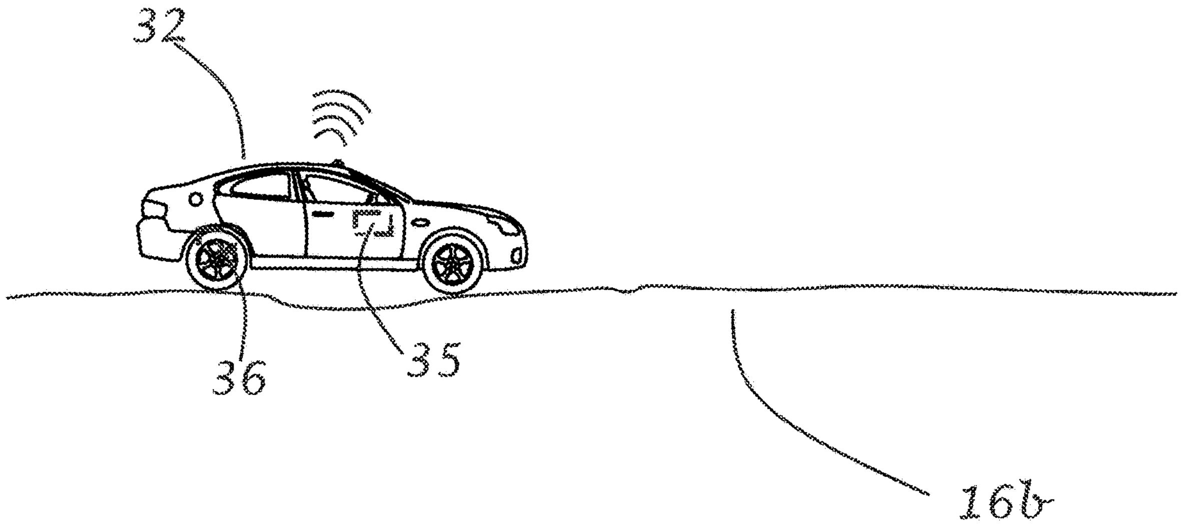

FIG. 3 illustrates a production vehicle 32 with production-vehicle sensors which may include, for example, a GNSS receiver, an IMU and/or one or more accelerometers. In FIG. 3, vehicle 32 is travelling along primary reference road segment **16*b* shown in FIG. 2. The vehicle 32 may receive data from the cloud about road segment 28, sometimes referred to as "ground truth" data, e.g. a known road profile or characteristic, and use the data to evaluate, calibrate and/or tune the output of its sensors or adjust the value of a parameter associated with the sensor. This may include developing or tuning transfer functions that relate onboard sensor measurements of sensors 34 and/or 36 to the characteristics of the road surface, e.g. road surface profile, of a road segment the vehicle is traveling over, e.g., the primary reference road segment 16*b*. In some embodiments, data collected by production vehicle 32 travelling over primary reference road segment 16*b*, may be used to e.g., characterize the accuracy or performance of one or more sensors in vehicle 32. This characterization of one or more sensors in vehicle 32** may subsequently be used to more accurately interpret data collected using those sensors while traveling on other road segments. In some embodiments, this characterization may include developing transfer functions that may be used to relate signals from one or more such production sensors to unknown road surface characteristics of other roads.

Alternatively, vehicle 32 may upload road surface data from sensors 34 and/or 36 as well as location information from GNSS receiver antenna 38 to the cloud. Included in the information transmitted to the cloud may be vehicle identifier information which may be use to associate the uploaded data with vehicle 32. One or more processors in cloud 40 may then be used to develop transfer functions that may be used to interpret data collected by production vehicle 32 on other road segments. Such transfer functions, based on the data collected by vehicle 32 while travelling on primary reference road segment **16*b* may be applied to data collected by vehicle 32** on other roads. Alternatively or additionally, based on the information gathered by a vehicle traveling on a primary reference road segment, one or more sensors on a vehicle may be tagged as defective or producing faulty data. A cloud-based processor receiving data in the future from such sensors may ignore or discount data from a particular sensor or set of sensors or the vehicle as a whole, when aggregating that data with data from other vehicles.

Figure 4:
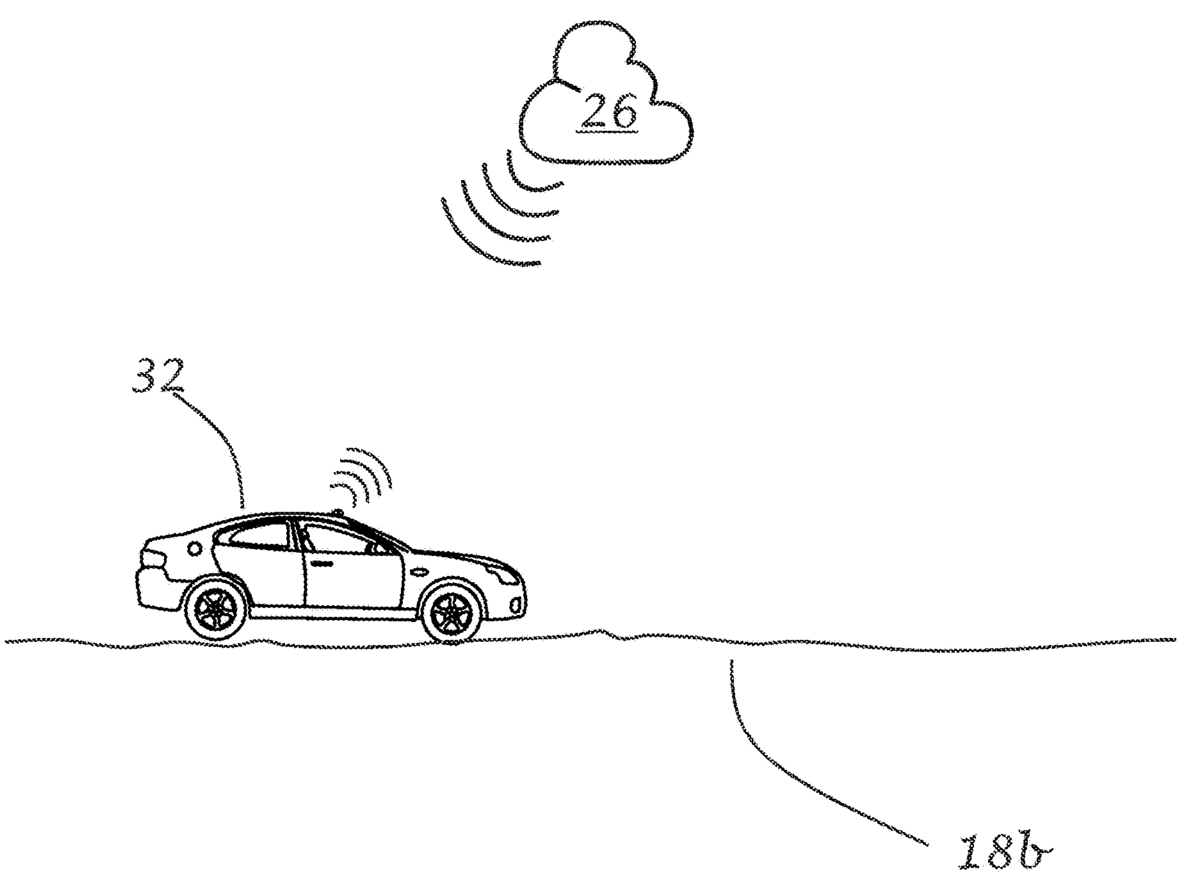
FIG. 4: Illustrates a secondary reference road segment, in the road network shown in FIG. 1, that is being characterized using on-board production vehicle sensors of the vehicle shown in FIG. 3.

In some embodiments, when vehicle 32 is travelling on another road segment such as for example segments **17*b* and 18*b* in FIG. 1 as shown in FIG. 4, for example, one or more microprocessors associated with the cloud (or on-board the vehicle) may use corrections and/or transfer functions previously associated with vehicle 32 to correct or improve the accuracy of the data being collected by vehicle 32. Based on the improved accuracy of sensors in vehicle 32, road surface characteristics of road segment 17*b* and/or 18*b* may be determined to a sufficient degree of accuracy, without reliance on vehicles with specialized road surface sensor systems, so that they may be used as a secondary reference road segments. Data collected by other vehicles while traveling on secondary reference road segments may then be used to develop transfer functions for those other vehicles in a similar fashion to the process described in connection to vehicle 32 in FIG. 3**.

In some embodiments, a data collected by one or more sensors on-board a vehicle, while traveling along a road segment, e.g., a primary or secondary road segment, where certain characteristics, e.g., road surface profile, have been predetermined to an acceptable level of accuracy by, e.g., averaging crowd sourced data from multiple vehicles or by using specialized equipment, may be used to adjust certain parameters associated with the one or more on-board sensors or other vehicle systems to improve their performance.

FIG. 5 illustrates an embodiment of a method 50 of improving the performance of a system on board a vehicle. In the depicted embodiment, a vehicle, e.g., a production vehicle, is traveling along a road segment at block 52. At block 54, sensors on-board the vehicle may be used to collect information about a motion of a portion of the vehicle in response to disturbances induced by aspects of the road surface. For example, accelerometers may be used to measure the acceleration, e.g., the vertical acceleration of the sprung mass or unsprung mass, induced by, e.g., interaction of the wheels of the vehicle with anomalies such as a speed bump or a pothole or the surface profile of the road surface. At block 56, previously collected information may be received about an aspect of the surface of the road segment. Based on the information collected in Block 54 and received in Block 56, the value of at least one parameter, e.g., gain or orientation, of an accelerometer attached to the wheel assembly, will be determined or adjusted at Block 58. At Block 60, based on the determination or adjustment in Block 58 the performance of an on-board sensor or other system will be improved. For example, the gain of an accelerometer will be adjusted in a manner that will improve its accuracy.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form.

Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method for operating a first production vehicle, the method comprising:

with the first production vehicle, travelling on a primary reference road segment, wherein the primary reference road segment is a part of a road network;

receiving sensor data from a first production sensor on-board the first production vehicle;

receiving road surface data from a data storage, wherein the road surface data is related to road surface characteristics of the primary reference road segment, wherein the road surface data was previously collected using a second vehicle that was equipped with at least one specialized road surface sensor system; and calibrating the first production sensor using the sensor data and the road surface data.

2. The method of claim 1, wherein calibrating the first production sensor includes modifying at least one parameter of a transfer function that relates an output of the first production sensor to road surface characteristics of a road in the road network.

3. The method of claim 2, wherein the road surface characteristics of the primary reference road segment in the road network are a road surface profile.

4. The method of claim 1, wherein the sensor data is received by a microprocessor on-board the first production vehicle.

5. The method of claim 1, wherein the road surface data is received by a microprocessor on-board the first production vehicle.

6. The method of claim 1, wherein the sensor data is received by a remotely-located cloud-based microprocessor.

7. The method of claim 1, wherein the road surface data is received by a remotely-located cloud-based microprocessor.

8. The method of claim 1, further comprising:

based on a comparison of the sensor data and the road surface data, determining that one or more sensors in the first production vehicle are sufficiently accurate;

while traveling over a second road segment in the road network with the first production vehicle, collecting additional road surface data;

determining road surface characteristics of the second road segment based on the additional road surface data with the one or more sensors in the first production vehicle; and using the second road segment as a secondary reference road segment.

9. The method of claim 8, further comprising:

with a second production vehicle, travelling on the secondary reference road segment;

receiving second production sensor data from a second production sensor on-board the second production vehicle, and using the road surface characteristics of the second road segment and the second production sensor data, calibrating the second production sensor on-board the second production vehicle.

10. The method of claim 1, wherein the road surface characteristics of the primary reference road segment are a road surface profile.

11. A method for operating a production vehicle, the method comprising:

with a first production vehicle, travelling on a road segment, wherein the road segment is a part of a road network;

collecting production sensor data about a road surface characteristic of the road segment with a first production sensor on-board the first production vehicle;

receiving information about the road surface characteristic, the information being at least partially based on road surface data collected by a second vehicle, wherein the second vehicle includes at least one specialized road surface sensor system; and based on the production sensor data about the road surface characteristic and the information about the road surface characteristic, calibrating the first production sensor.

12. The method of claim 11, wherein calibrating the first production sensor includes modifying at least one parameter of a transfer function that relates an output of the first production sensor to the road surface characteristic.

13. The method of claim 12, wherein the road surface characteristic is a road surface profile.

14. A method for operating a production vehicle, the method comprising:

with the production vehicle, travelling on a road segment, wherein the road segment is a primary or secondary reference road segment, and wherein the road segment has a road surface profile;

while travelling on the road segment, receiving signal data representative of a response of a sensor on-board the production vehicle;

receiving prerecorded information about the road surface profile of the road segment; and based on the signal data and the prerecorded information about the road surface profile of the road segment, determining a degree of accuracy of the sensor.

15. The method of claim 14, further comprising uploading, to a cloud database, the signal data and the degree of accuracy if the degree of accuracy is above a threshold value.

16. The method of claim 14, further comprising discounting or ignoring the signal data if the degree of accuracy is below a threshold value.

17. A method of improving performance of a system on-board a vehicle while traveling on a road segment, the method comprising:

while traveling along the road segment, receiving information about a motion of a portion of the vehicle from an on-board sensor;

receiving previously determined data about an aspect of a surface of the road segment;

based on the information about the motion of the portion of the vehicle and the previously determined data about the aspect of the road segment, adjusting a value of a parameter associated with the system on-board the vehicle; and as a result of the adjustment of the value of the parameter, improving a performance of the system.

18. The method of claim 17, wherein the system on-board the vehicle is a sensor.

19. The method of claim 18, wherein the sensor is an accelerometer.

20. The method of claim 17, wherein the portion of the vehicle is an unsprung mass of the vehicle.

21. The method of claim 20, wherein the on-board sensor is attached to the unsprung mass of the vehicle and the motion is a vertical motion of a wheel assembly.

22. A method of improving performance of at least one sensor system on-board a vehicle while traveling on a road segment, the method comprising:

while traveling along the road segment, receiving information related to a road surface profile of the road segment from the at least one sensor system on-board the vehicle;

based on the information related to the road surface profile of the road segment, adjusting a value of a parameter associated with the at least one sensor system on-board the vehicle; and as a result of the adjustment, improving a performance of the at least one sensor system.

23. The method of claim 22, wherein the at least one sensor system is selected from the group consisting of an accelerometer system, an IMU system, a displacement sensor system, an optical sensor system, and a LIDAR system.

24. The method of claim 22, wherein the road segment is a primary reference road segment or a secondary reference road segment.

25. The method of claim 24, further comprising adjusting the value of the parameter based on the information related to the road surface profile of the road segment received from the at least one sensor system on-board the vehicle and previously stored information related to the road surface profile of the primary reference road segment or the secondary reference road segment.

* * * * *